United States Patent Office 3,487,686
Patented Jan. 6, 1970

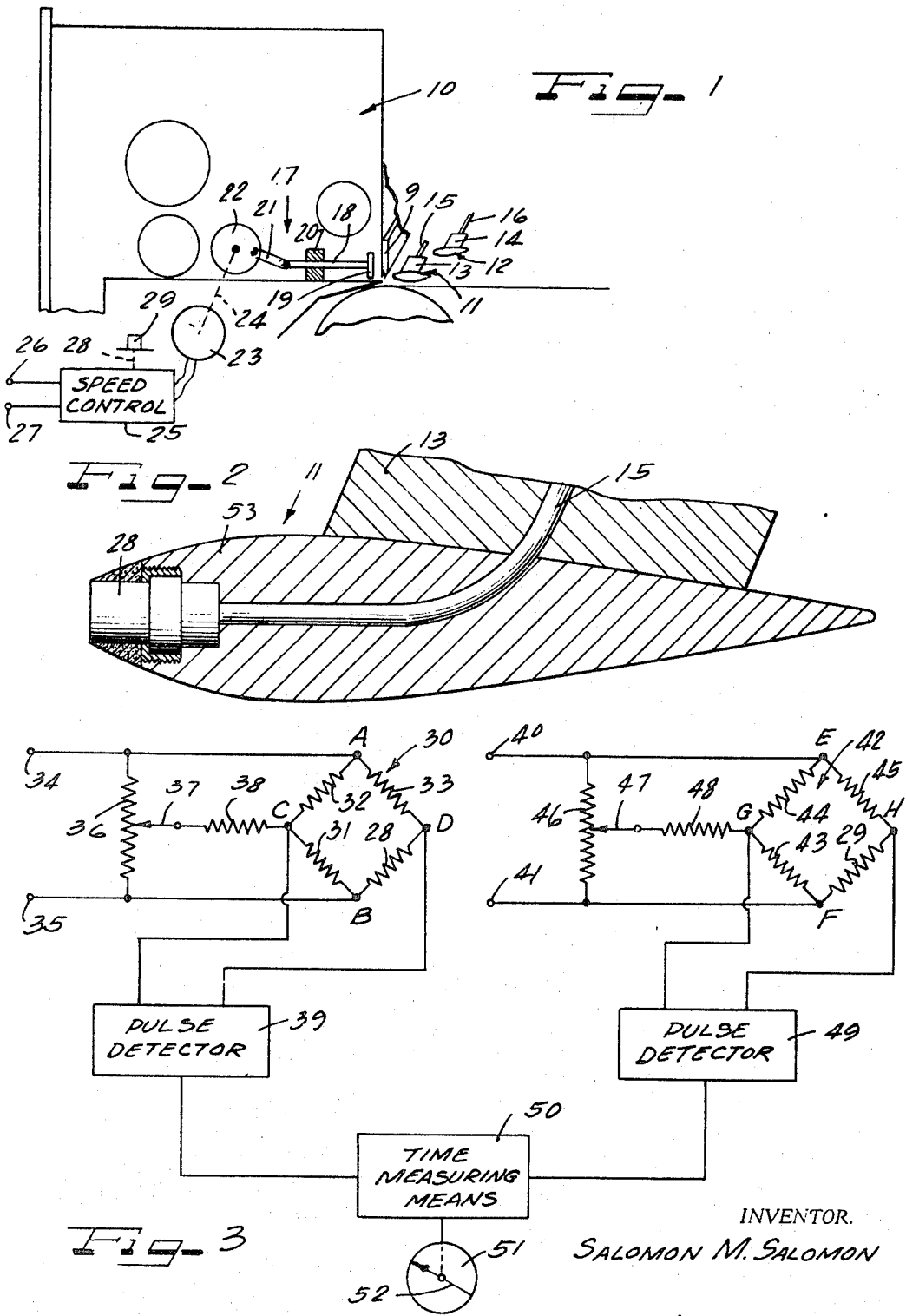

3,487,686
VELOCITY MEASUREMENT FOR HEADBOXES
Salomon M. Salomon, Madison, Wis., assignor to Beloit Corporation, Beloit, Wis., a corporation of Wisconsin
Filed Nov. 15, 1967, Ser. No. 683,167
Int. Cl. G01f 1/04
U.S. Cl. 73—194                                   8 Claims

ABSTRACT OF THE DISCLOSURE

Method and apparatus for measuring the jet volocity by impulse method. Pulses are generated in a headbox of a paper machine and a pair of probes spaced longitudinally along the jet detect the pressure differential caused by the pulses. The time differential of the arrival of the pressure variation at the two probes is indicative of the jet velocity.

Description of the invention

This invention relates in general to measuring apparatus and in particular to a method and apparatus for measuring velocity in a jet.

In a paper machine the paper stock emerges onto the wire of a paper machine where it is evenly distributed to be converted into paper. The velocity of the jet of paper stock from the headbox controls the thickness and other characteristics of the paper. The slice delivery from the headbox is controlled by an adjustable slice.

It is an object of the present invention to provide a novel method for measuring the velocity of a jet emerging from a headbox.

Another object is to provide a novel apparatus for indicating jet velocity.

Still another object is to provide apparatus for accurately and quickly indicating the velocity of a jet stream by generating a pressure wave in the stream.

A feature of this invention is found in the provision for generating a pressure wave in paper stock as it emerges from a slice gate and to detect at two points the time of arrival of the pressure wave and determine the jet velocity from the distance between the probes and the time differential of the arrival at the two probes of the pressure wave.

Further objects, features, and advantages of the invention will become apparent from the following description and claims when read in view of the drawings, in which:

FIGURE 1 is a view showing the probes of this invention mounted for measuring the jet velocity by impulse method;

FIGURE 2 is a detailed view of one of the probes of FIGURE 1, and;

FIGURE 3 is a partial schematic and partial block view of the velocity indicating means.

FIGURE 1 illustrates a headbox 10 of a paper machine, for example, with an adjustable slice gate 9 through which a jet of paper stock emerges. A pair of probes 11 and 12 are supported in the jet by mechanical supports 13 and 14. Sensing transducers are mounted in the forward ends of probes 11 and 12 and produce an electrical output which varies with pressure as described in copending application Ser. No. 490,389 entitled "Sensing Device for Slice Delivery," filed Sept. 27, 1965. Cables 15 and 16 are connected to the transducers in the probes.

As best shown in FIGURE 2, the probe 11 supports a pressure transducer 28 which is supported by a housing 53 supported on strut 13. The cable 15 removes an electrical output from transducer 28.

Mounted within the headbox 10 ahead of the slice gate 9 is a wave generating apparatus designated generally as 17. This comprises a plunger 18 with a blade 19 mounted in a guide 20. A link 21 is pivotally attached to plunger 18 and has its other end connected to a disc 22. A motor 23 has the disc 22 mounted on its output shaft 24. The motor might be mounted outside of the headbox 10 and the shaft 24 extended through the wall of the headbox. A speed control 25 is connected to power terminals 26 and 27 and is electrically connected to motor 23 to vary its speed. A speed control shaft 28 with knob 29 is connected to the speed control 25 to vary the speed of motor 23.

As best shown in FIGURE 3, each of the probes 11 and 12 include transducers 28 and 29. These are connected in bridge circuits to detect pressure variations on the probes.

Transducer 28 is connected as one leg of a bridge 30 having resistors 31, 32 and 33. A suitable power source is connected to terminals 34 and 35 which are connected respectively to points A and B of bridge 30. A resistor 36 is connected between terminals 34 and 35 and a wiper contact 37 engages it. A resistor 38 is connected between contact 37 and point C of bridge 30. A pulse detector 39 is connected to points C and D of the bridge 30.

Transducer 29 is connected as one leg of a bridge 42 having resistors 43, 44 and 45. A suitable power source is connected to terminals 40 and 41 which are connected to points E and F of bridge 42. A resistor 46 is connected between terminals 40 and 41 and a wiper contact 47 engages it. A resistor 48 is connected between contact 47 and point G of the bridge. A second pulse detector 49 is connected to points G and H of bridge 42.

A time measuring means 50 is connected to pulse detectors 39 and 49 and produces an output which indicates the time difference between pulses received from detectors 39 and 49. A meter 51 has a needle 52 and is connected to the time measuring means 50. The meter 51 is calibrated to indicate the velocity of the jet in which the probes 11 and 12 are mounted.

In operation, the probes 11 and 12 might be spaced about two inches in the machine direction and a few inches apart transversely so that the first probe does not disturb the flow about the second one.

The motor control 25 is adjusted to control the speed of the motor 23 and blade 19. The blade 19 produces pulses in the liquid ahead of the outlet such that they approach the slice evenly. For example, pulses at a frequency of 40 cycles per second may be generated.

The pressure waves will travel at the velocity of the jet once they leave the slice and the jet velocity may be determined by detecting the time difference of the pressure wave between detectors 28 and 29, since velocity is equal to the distance between probes in the machine direction divided by the timed difference of arrival of the pressure wave.

Pulses are produced each time a pressure wave impinges on transducers 28 and 29 which are detected by pulse detectors 39 and 49. Time measuring means 50 receives the outputs of pulse detectors 39 and 49 and measures their time difference. An output is produced from means 50 and indicated on meter 51 which indicates the velocity of the jet.

This apparatus measures velocity with great accuracy. For example, if a time of 3.3 milliseconds is required for a wave to travel the distance between the two probes, and if the distance between the probes is two inches, the velocity would be 3000 feet per minute with an error of 0.030 feet per minute under optimum conditions.

The principles of the invention explained in connection with the specific exemplifications thereon will suggest many other applications and modifications of the same. It is accordingly desired that in construing the breadth of the appended claims they shall not be limited to the specific

I claim as my invention:

1. Means for measuring the velocity of a slice delivery in a paper machine comprising, a headbox having a slice delivery, pulse producing means mounted in said headbox and producing pulses in the slice delivery, a pair of pressure transducers mounted in the slice delivery path and said pressure transducers spaced longitudinally in the slice delivery relative to each other, a pair of means for detecting pulses connected to the pair of pressure transducers, and time measuring means connected to the pair of means for detecting pulses and producing an output indicative of the velocity of the slice delivery.

2. In apparatus according to claim 1 wherein the pulse producing means generates a wave front which is substantially at right angles to the direction of the slice delivery.

3. In appartus according to claim 1 wherein said pulse producing means comprises an agitator paddle mounted for longitudinal motion relative to the slice path within the headbox and driving means connected to said agitator paddle to impart longitudinal motion thereto.

4. In apparatus according to claim 1 wherein the pair of transducers are offset laterally in the slice delivery.

5. In apparatus according to claim 1, an indicator receiving an output from the time measuring means to indicate the velocity of the slice delivery.

6. In apparatus according to claim 1, a pair of bridge circuits with each of the pair of pressure transducers forming one leg of each bridge circuit, and each means for detecting pulses connected to the output of one of the bridge circuits.

7. In apparatus according to claim 1, a pair of streamlined housings supporting said pressure transducers in the slice delivery.

8. The method of determining the velocity of the slice delivered from a headbox comprising, generating pulses in the headbox ahead of the slice delivery, detecting at a pair of points spaced longitudinally in the slice flow pulses in the slice flow, and comparing the time of arrival of said pulses to determine the slice delivery.

References Cited

UNITED STATES PATENTS

| | | | |
|---|---|---|---|
| 3,204,457 | 9/1965 | Howatt | 73—67.5 |
| 3,313,681 | 4/1967 | Dennis et al. | 162—347 |

JAMES J. GILL, Primary Examiner

H. GOLDSTEIN, Assistant Examiner

U.S. Cl. X.R.

162—263